(12) United States Patent
Merkel et al.

(10) Patent No.: US 9,054,552 B2
(45) Date of Patent: Jun. 9, 2015

(54) SYSTEM FOR POWER DISTRIBUTION AND COMMUNICATION

(75) Inventors: Harald Merkel, Lindome (SE); Per Herolf, Lidingö (SE); Stephan Mangold, Mölndal (SE)

(73) Assignee: Zoliex AB, Lidingo (SE)

( * ) Notice: Subject to any disclaimer, the term of this patent is extended or adjusted under 35 U.S.C. 154(b) by 425 days.

(21) Appl. No.: 13/516,428

(22) PCT Filed: Dec. 17, 2010

(86) PCT No.: PCT/EP2010/007672
§ 371 (c)(1),
(2), (4) Date: Jun. 15, 2012

(87) PCT Pub. No.: WO2011/079912
PCT Pub. Date: Jul. 7, 2011

(65) Prior Publication Data
US 2012/0283891 A1 Nov. 8, 2012

(30) Foreign Application Priority Data
Dec. 28, 2009 (SE) ...................................... 0901616

(51) Int. Cl.
*H02J 1/06* (2006.01)
*H02J 13/00* (2006.01)

(52) U.S. Cl.
CPC ................ *H02J 1/06* (2013.01); *H02J 13/0003* (2013.01); *Y02B 90/228* (2013.01); *Y04S 20/18* (2013.01)

(58) Field of Classification Search
CPC ......... H02J 1/06; H02J 13/0003; Y04S 20/18; Y02B 90/228

USPC ........ 700/22, 286, 291, 295–298; 702/60–62; 340/13.23, 286.02, 333, 425.2
See application file for complete search history.

(56) References Cited

U.S. PATENT DOCUMENTS

| 5,033,112 | A | 7/1991 | Bowling et al. |
| 6,216,956 | B1 * | 4/2001 | Ehlers et al. ..................... 236/47 |
| 7,005,969 | B2 * | 2/2006 | Fisher et al. .................. 375/258 |
| 7,343,226 | B2 * | 3/2008 | Ehlers et al. .................. 700/276 |
| 7,424,031 | B2 | 9/2008 | Binder |

(Continued)

FOREIGN PATENT DOCUMENTS

| DE | 19758709 B4 | 4/2007 |
| WO | 96/41408 A1 | 12/1996 |
| WO | 2007/047615 A2 | 4/2007 |

*Primary Examiner* — Ramesh Patel
(74) *Attorney, Agent, or Firm* — Porter Wright Morris & Arthur LLP (57) ABSTRACT

A system for power distribution and communication over a two-wire network comprises a control unit (dedicated or distributed) configured to receive power from the two-wire network and provided with a transceiver circuitry connected to the two-wire network, a power converter unit having a power converter which converts incoming voltage to a DC-voltage of less than 50 V and feeds the DC-voltage to the two-wire network, and a power fuse unit with a power fuse identity connected between the power converter and the two-wire network. The power fuse unit forwards the DC-voltage to the two-wire network and comprises a transceiver circuitry connected to the two-wire network and a fuse. The system monitors an amount of power consumed in the network and activates a power switch in the power fuse unit when the amount of power consumed in the two-wire network exceeds predetermined limits.

28 Claims, 4 Drawing Sheets

(56) References Cited

U.S. PATENT DOCUMENTS

| | | | |
|---|---|---|---|
| 7,506,179 B2* | 3/2009 | Templeton | 713/300 |
| 7,518,894 B2* | 4/2009 | Fosler et al. | 363/72 |
| 8,175,463 B2* | 5/2012 | Elberbaum | 398/141 |
| 8,248,230 B2* | 8/2012 | Covaro et al. | 340/538 |
| 8,294,296 B2* | 10/2012 | Gilmore et al. | 307/45 |
| 8,325,636 B2* | 12/2012 | Binder | 370/294 |
| 8,331,795 B2* | 12/2012 | Elberbaum | 398/141 |
| 8,502,470 B2* | 8/2013 | Barnett et al. | 315/297 |
| 8,582,330 B2* | 11/2013 | Kalms et al. | 363/34 |
| 8,582,598 B2* | 11/2013 | Binder | 370/463 |
| 2003/0036819 A1 | 2/2003 | Lehr et al. | |
| 2004/0061380 A1* | 4/2004 | Hann et al. | 307/43 |
| 2004/0117330 A1 | 6/2004 | Ehlers et al. | |
| 2009/0134703 A1 | 5/2009 | Chung et al. | |

* cited by examiner

Fig. 1 (prior art)

——— 48 VDC
---- house keeping
······· Data comm.

SYSTEM FOR POWER DISTRIBUTION AND COMMUNICATION

RELATED APPLICATION

The present application is a 371 of PCT/EP2010/007672 filed Dec. 17, 2010.

TECHNICAL FIELD

The present invention relates to a system for power distribution and communication over a two-wire network. In particular, the power distribution is performed using a low DC-voltage, e.g. defined as Safety Extra Low Voltage (SELV), and the system provides communication between network units over the two-wire network.

BACKGROUND

Apparatuses used in a domestic environment are normally powered using AC voltage (110V-240V; 50-60 Hz) and if needed connected to a separate communication network. Some domestic apparatuses are powered using DC voltage, which normally is provided by converting AC voltage (VAC) to a suitable DC-voltage (VDC). In order to simplify power distribution, separate feed cables for VDC and VAC have been proposed.

U.S Pat. No. 5,003,112 assigned to Northern Telecom Limited, discloses a closed loop, programmable power and communication system, in which feed cables for VAC and VDC are provided together with a separate cable for data communication purposes. The incoming VAC is converted to a 48 VDC and a cable bundle including AC and DC power distribution as well as data communication is wired throughout a building.

The system disclosed in U.S. Pat. No. 5,003,112 is briefly described in connection with FIG. 1, in which the traditional wiring of a power distribution network is used, such as arranging a switch on the data feed cable for the purpose of controlling a lamp connected to a power outlet, see switch 18 and the lamp 17 in FIG. 1.

It has also been proposed to distribute VDC within a Local Area Network using a twisted pair network with a superimposed data communication channel.

U.S. Pat. No. 7,424,031, assigned to Serconet Ltd, discloses a combined VDC and data communication over a twisted pair cable in a local area network (LAN). existing telephone wiring, or electrical wiring, in a building may be used to create the LAN. The data communication signal may be implemented as a superimposed signal over the DC voltage, as disclosed in US 2003/0036819, paragraph [0048].

Although power distribution and communication has been implemented over a two-wire network, such as a twisted pair cable, there still exists a need to further simplify wiring of different units in such a network.

SUMMARY OF THE INVENTION

An object with the present invention is to provide a system for power distribution which is more flexible than prior art systems, This object is achieved by a system for power distribution and communication over a two-wire network. The system comprises a control unit provided with a transceiver circuitry connected to the two-wire network; a power converter unit configured to convert at least one incoming voltage to a pre-determined DC-voltage of less than 50 V and to feed the DC-voltage to the two-wire network; and a power fuse unit with a unique identity connected between the power converter unit and the two-wire network. The power fuse unit comprises a transceiver circuitry connected to the two-wire network, and a power switch configured to terminate feeding of said DC-voltage to the two-wire network when activated. The control unit is further configured to monitor an amount of power consumed in the two-wire network, and adapted to communicate with the power fuse unit over the two-wire network to activate the power switch when the amount of power consumed in the two-wire network exceeds at least one predetermined limit.

An advantage with the present invention is that a simple and robust power distribution and communication network may be achieved where communication comprises node to node communication for control purposes (e.g. housekeeping) as well as high speed data channels offered to the user at distinct nodes. Such high speed channels are monitored and controlled by the signalling in the housekeeping network, but the high speed communication channel has no influence on the signalling in the housekeeping network.

In a preferred embodiment, the network comprises a number of nodes linked together by a set of two-wire connections. Each node of the two-wire network has a unique logical identity used to control the function of the node. One of these nodes functions as the control unit and/or back-up control unit if the control unit malfunctions.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

Figure 1:
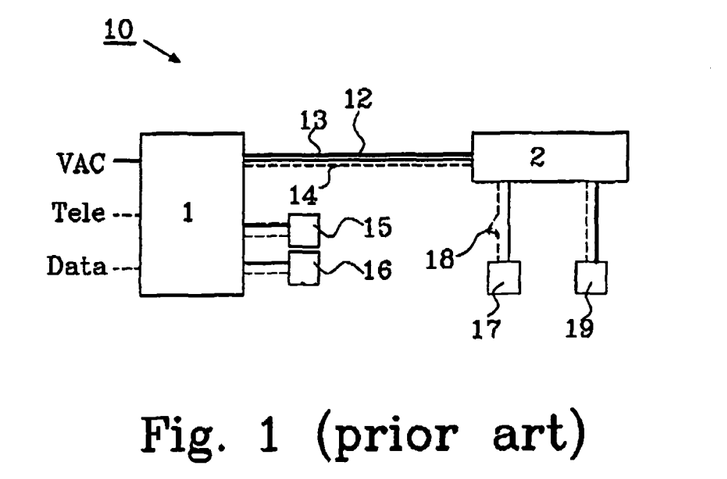
FIG. 1 shows a prior art system with power distribution and data communication over separate wires.

FIG. 1 shows a prior art system 10 for power distribution and communication. Incoming VAC, telecommunication and data communication are fed to a service entrance unit 1 in which a feed cable for VAC 12 and a feed cable for VDC 13 are provided together with a separate cable 14 for data communication purposes. The incoming VAC is converted to a 48 VDC in the service entrance unit 1, and a cable bundle including AC and DC power distribution as well as data communication is wired throughout a building to one or more network interface 2.

A dedicated network for specific appliances, such as a stove 15 or a laptop computer 16, is also provided in which the required amount of power (VAC for the stove 15 and VDC for the laptop computer 16) may be distributed in response to an interrogation enquiry over a data communication link (dashed lines). Appliances normally is connected to power and communication network via the network interface 2, such as a lamp 17 provided with a power switch 18, or a television set 19.

The lamp requires 48 VDC and a power line is provided between the network interface 2 and the lamp 17. A communication line, e.g. an optic fibre is also provided between the network interface 2 and the lamp via the power switch. The lamp will not be powered if the data communication line is broken, and the lamp will be powered when data communication is established between the network interface and the lamp 17. Examples of optic fibre power switches are provided in U.S. Pat. No. 5,033,112.

Figure 2:
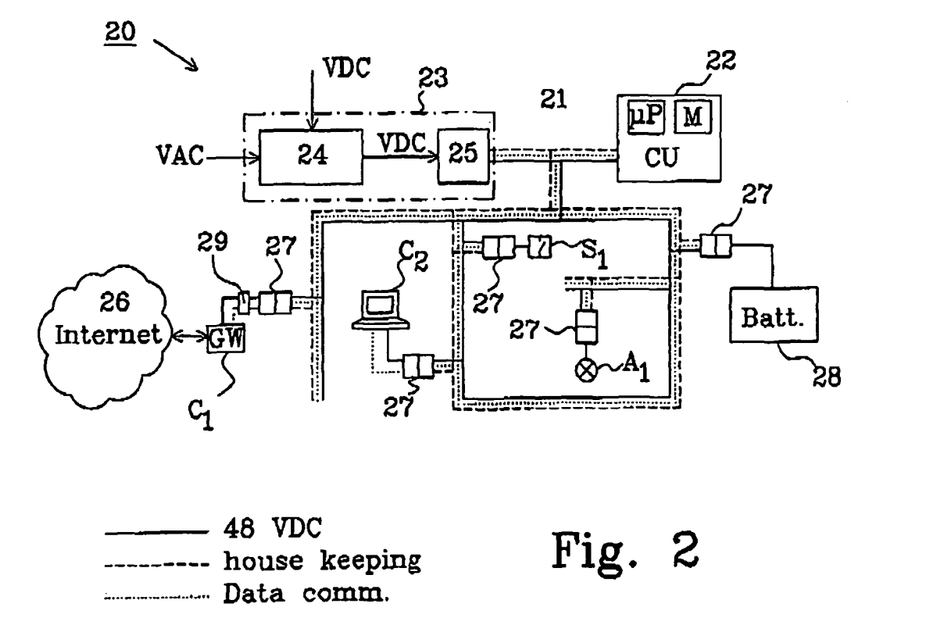
FIG. 2 shows a first embodiment of a power distribution system according to the present invention.

FIG. 2 shows a first embodiment of a system 20 for power distribution and data communication over a network 21 using only two wires (two-wire network). Power is distributed using only a predetermined DC-voltage (so called network DC-voltage) and the communication between units connected to the two-wire network is preferably performed as superimposed signals. One or more communication channels may be implemented, which may be used for different purposes. For instance a first communication channel may be used for "housekeeping", i.e. to monitor and control units connected to the two-wire network 21, and a second optional communication channel may be used for high speed data communication.

The system, in this embodiment, comprises (in addition to the two-wire network 21) a dedicated control unit 22 and a power converter unit 23. The control unit 22 comprises a transceiver circuitry, connected to the two-wire network 21 for communication purposes, and a power inlet configured to receive power from the two-wire network 21. The power converter unit 23 comprises a power converter 24 and a power fuse unit 25. The power converter 24 converts one or more incoming voltages, such as 230 VAC (mains), any VDC (wind power/solar power), 400 VAC multi-phase (3-phase mains), etc., to a network DC-voltage of less than 50 Volts, preferably 48 VDC, which is fed to the two-wire network 21 via the power fuse unit 25. This may be realised using an AC/DC converter, a multi phase AC/DC converter configured to distribute power load over all phases when generating the network DC-voltage, and/or a DC/DC converter configured to convert any DC voltage to the network DC-voltage. If the incoming voltage is the same DC-voltage as the network DC-voltage, no DC/DC converter is necessary.

The main purpose of the power fuse unit 25 is to forward the network DC-voltage from the power converter 24 to the two-wire network 21. The power fuse unit 25, which is provided with a unique identity, is provided with a transceiver circuitry connected to the two-wire network for communication purposes. In order to prevent an overload (e.g. caused by a short circuit) in the system, the power fuse unit 25 is further provided with a power switch configured to terminate forwarding of the network DC-voltage to the two-wire network when activated.

The control unit 22 is also provided with a microprocessor μP and a memory M, in which the unique identity of the power fuse unit 25 is stored, and is further configured to monitor an amount of power consumed in the two-wire network. The control unit 22 communicates with the power fuse unit 25 over said two-wire network, preferably in the housekeeping network, to activate, i.e. change the state of, the power switch when the amount of power consumed in the two-wire network exceeds a predetermined limit.

As illustrated in FIG. 2, the two-wire network 21 is illustrated using a continuous line (representing the network DC-voltage), a dashed line (representing the housekeeping network), and a dotted line (representing the data communication network). Any shape of the two-wire network may be used as long as the control unit 22 may communicate with any unit which has its unique identity stored in the control unit's memory M, such as the identity of the power fuse unit 25.

In the present embodiment, multiple nodes 27, each provided with a unique identity, may be connected to the two-wire network 21 at a suitable location. Each node 27 receives power from the two-wire network 21 and comprises a transceiver circuitry connected to the two-wire network. The unique identity of each node is known to the control unit 22 and is stored in the memory M, and the control unit 22 communicates with each node 27 over the housekeeping network using a communication protocol. The status of each node is monitored by the control unit according to a predetermined scheme.

At least one node of the multiple nodes is configured as a sensor node and at least one node of the multiple nodes is configured as an actuator node. A sensor node is defined as an entity having at least two states and each sensor node is associated with, and controls, at least one actuator node in response to the current state of the associated sensor node. The association between each sensor node and the at least one actuator node is stored in the memory M in the control unit 22, preferably in the form of a link list as exemplified below.

All the nodes 27 preferably have an identical basic configuration, and may be reconfigured by connecting a sensor unit $S_n$, (n=1, ..., N) to any node 27 in order to obtain a sensor node. A sensor unit may be any device belonging to the group: light switch; dimmer; alarm sensor; motion sensor; photo sensor; sound sensor; vibration sensor; moisture sensor; gas sensor; integrity sensor or temperature sensor. In FIG. 2, a sensor unit $S_1$ is exemplified as a light switch. The control unit will become aware of the sensor unit when a status update of the node 27, to which the sensor unit is connected, is requested by the control unit 22. The identity of each sensor node is stored in the control unit together with an indication of sensor type and the current status of the sensor unit (position; percentage of power to be distributed 0-100%; motion/no motion; temperature level, etc.) this information will be used to control any actuator node associated with the sensor node.

TABLE 1

Examples of sensor unit information stored in the control unit.

| Node | Identity | Type | Status |
|---|---|---|---|
| 1 | ID: 1 | Switch (1 or 2) | Position 1 |
| 2 | ID: 2 | Dimmer (0-100%) | 30% power level |
| 3 | ID: 3 | Temperature | 22° C. |
| 4 | ID: 4 | Switch (1 or 2) | ON |

The basic configuration of the nodes 27 may also be reconfigured by connecting an actuator unit $A_m$, (m=1, ..., M) to any node 27 in order to obtain an actuator node. In FIG. 2, an actuator unit $A_1$ is exemplified as a lamp. An actuator unit may be any device belonging to the group: lamp; lighting system; alarm system; motor; pneumatic system; or heater. The control unit will become aware of the actuator unit when a status update of the node 27, to which the actuator unit is connected, is requested by the control unit 22. The identity of each actuator node is stored in a 5 together with an indication of the actuator type, as illustrated in table 2.

As mentioned above, a link list indicating the associations between sensor nodes and actuator nodes is also stored in the control unit. Table 3 illustrates how this may be achieved.

TABLE 2

Examples of actuator unit information stored in the control unit

| Identity | Type | Power level |
|---|---|---|
| ID: 5 | Lamp | 0%/100% |
| ID: 6 | Heater | 0-100% |
| ID: 7 | Lamp | 0-100% |
| ID: 8 | Lamp | 0%/100% |

TABLE 3

Examples of associations between sensor units and actuator units stored in the control unit

| Association | Sensor unit | Actuator unit(s) |
|---|---|---|
| 1 | ID: 1 | ID: 5 and ID: 8 |
| 2 | ID: 4 | ID: 5 and ID: 8 |
| 3 | ID: 2 | ID: 7 |
| 4 | ID: 3 | ID: 6 |

The first and the second associations are together a typical example of a configuration that is needed in stairs, i.e. one switch at the bottom of the stairs and one at the top of the stairs. Both lamps connected to nodes ID:5 and ID:8 may be controlled by either switch connected to node ID:1 or ID:4. If either one of the sensor nodes change their status (i.e. from position 1 to 2, or from position 2 to 1) the power distribution to the lamps will alter (i.e. the lamps will be turned on if they are switched off or the lamps will be switched off if they are turned on). Please note that no extra cables between the switches are needed to obtain the desired function and the configuration may easily be modified by associating more actuator units to the switches, and/or adding a new switch to control the same lamps.

The third association relates to a normal dimmer connected to node ID:2 which may control the amount of power being distributed to a lamp connected to node ID:7 in the two-wire network 21. It is even possible to associate two different dimmers to the same lamp (similar to the switches described above) and the amount of power distributed to the lamp will depend on the combined status of the dimmers or, if desired, the amount of power distributed to the lamp may be independently controlled by either of the dimmers, as long as the association is defined in the control unit.

The fourth association is an example of how to control the heating system in a building in the form of a heater connected to node ID:6 in response to a temperature sensor connected to node ID:3 in the two-wire network. It is naturally possible to include a temperature sensor in suitable locations, such as in every room in the building, and control the heating in every room independently of each other based upon the status of the temperature sensor connected to a node in the two-wire network In short, the control unit 22 is configured to communicate with each sensor node and each actuator node over the housekeeping network to identify changes in the current state of each sensor node and to control each associated actuator node in response to the identified changes in the current state of each sensor unit.

In a system comprising multiple sensor nodes and multiple actuator nodes, and the associations between sensor nodes and actuator nodes may represent arbitrary logical combinations, i.e. logical relations between output variables of sensor nodes and input variables of actuator nodes, or other variables available to the system at this or previous instants. The logical relations' complexities are only limited by the available memory. Furthermore, in most cases a function is coupled to each association. The variations are unlimited, as is obvious to a skilled person, as long as the associations between sensor unit and actuator units are maintained in the control unit. The change in the current state of each sensor unit is identified by evaluating output variables, and input variables of each associated actuator node are controlled based on the required logical relations using the housekeeping network.

An energy storage unit, such as a battery 28 or the like, may also be connected to a node 27. Energy, which may be used in the event of power failure from the incoming VAC, can be stored to be used whenever the need arises. For instance, energy may be stored in connection with an appliance that requires a high amount of energy over a short time period, such as a stove, iron, water boiler, etc.

The system further may be provided with a data communication network (indicated by the dotted line in the two-wire network) preferably implemented as a second superimposed communication channel on said two-wire network. However, a physically separate communication network, such as an optic fibre may be used without departing from the inventive concept When a data communication network is present, the control unit 22 is configured to communicate with each node 27 being connected to the data communication network. Some of the nodes 27 may be configured as pure communication nodes, i.e. not connected to a sensor unit S. or an actuator unit $A_m$, configured to provide network DC-voltage and data communication to a communication unit $C_p$, (p=1, . . . , P). The control unit 22 will be informed about the node's identity and that data communication is provided. In FIG. 2, communication units have been exemplified as: an Internet Gateway $C_1$ providing access to Internet 26, a computer $C_2$ which may have access to Internet provided the control unit is programmed to allow Internet access for the node 27 to which the computer $C_2$ is connected.

As a security measure, the control unit 22, which is configured to communicate with each communication node 27 over the housekeeping network, may also be configured to monitor the housekeeping network and identify any unauthorized manipulation of the communication over the housekeeping network. In order to react to an identified unauthorized manipulation of the housekeeping network, the system is also provided with a data communication switch 29, with a unique identity known to the control unit that is activated by the control unit to terminate Internet access to all communication units in the two-wire network 21. The data communication switch 29 is preferably, but not necessarily, provided between the communication node and the Internet Gateway. In order to achieve this, the housekeeping network must be separated from the data communication network, either in two physically separated networks or in two separate communication channels on the same physical network.

The amount of power consumed in the two-wire network is preferably monitored in order to identify any short circuits, and possibly prevent accidents caused by rapid power drain, in any part of the two-wire network Power consumption is monitored by the control unit that collect information of consumed power from units connected to the power distribution network. This may be achieved by incorporating a power meter in the power fuse unit, where the total power consumption may be measured. However, the preferred way to achieve this is to let each node 27 monitor (i.e. measure) the amount of power consumed in the node, and communicate the information regarding the amount of power consumed to the control unit over the housekeeping network. The control unit 22 will then be able to independently control power distribution to each node 27 and terminate feeding power to any node if the power consumption for a particular node exceeds a predetermined limit, which may occur if a short circuit has been detected, or limit the amount of power distributed to that particular node if needed.

Figure 3:
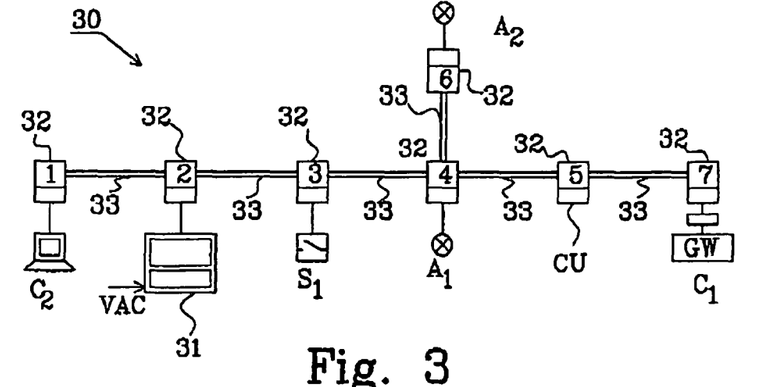
FIG. 3 shows a second embodiment of a power distribution system according to the present invention.

FIG. 3 shows a second embodiment of a system 30 for power distribution and communication over a two-wire network. A combined power converter fuse unit 31 and seven nodes 32 are provided in this example being interconnected by two-wire connections 33 to form the two-wire network. In this embodiment, there is no dedicated control unit (as in FIG. 2), and any of the nodes 32 may be configured to act as a control unit. The nodes are constructed in such a way that the network DC-voltage provided from the combined power converter and fuse unit 31 is available to all nodes irrespectively if the node is activated or not. Therefore, it is possible to first activate e.g. node "5" which will act as the control unit. An update request will be transmitted over the two-wire connection attached to node "5" and the first node that send a response back to node "5" will be put on the identity list (as explained above) together with information regarding any units connected to that particular node. This process continuous until all nodes 32 in the system has been identified and the required links between sensor nodes and actuator nodes have been established.

It is also possible to let configured a node to act as a back-up control unit if the control unit (i.e. node "5") malfunctions.

The control unit in FIGS. 2 and 3 are configured to continuously send out an update request to all nodes in the system. If the update request is not transmitted to the nodes, especially to the back-up control unit, a system alarm is issued and the back-up control unit (if provided) will assume command. If no back-up control unit is available, a system restart will be initiated and the first node that is reactivated, manually or automatically, will be appointed to be control unit.

Figure 4:
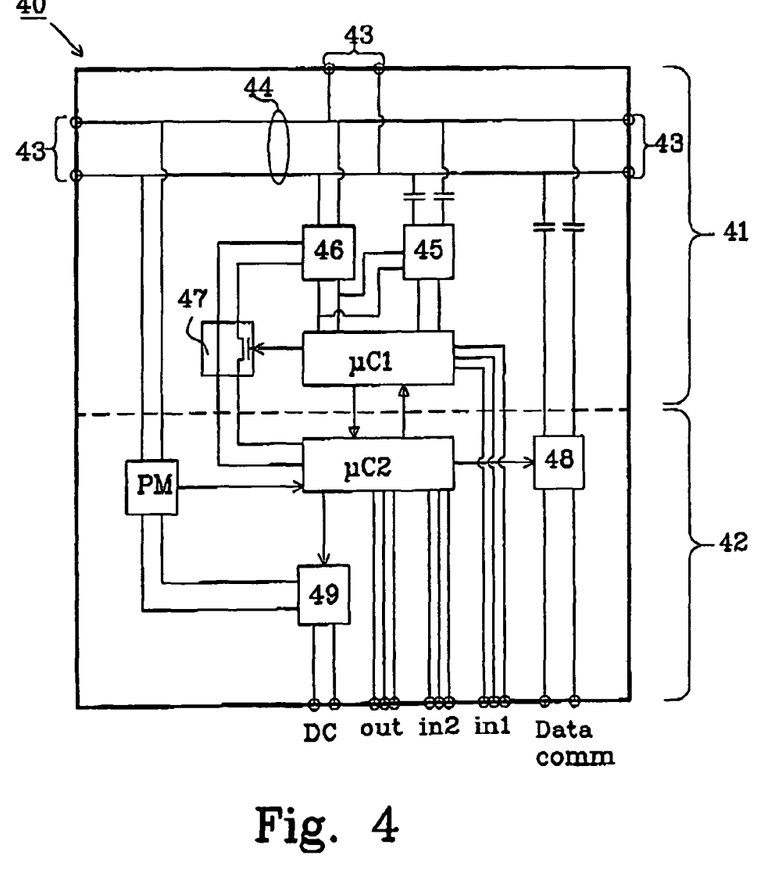
FIG. 4 shows a node that may be implemented in the two-wire network according to the invention.

FIG. 4 shows a node 40 comprising two parts, a network part 41 and a connector part 42. The network part 41 has at least one double port connector 43 (in this example two extra double port connectors are illustrated). In this embodiment a connection 44 between the double connector ports 43 are provided for the network DC-voltage, housekeeping network and data communication network. An RF transceiver 45 is connected to the connection 44 and is configured to listen to requests transmitted from the control unit (not shown). A power supply 46 provides necessary power (e.g. less than 1 mW) to energize the transceiver circuitry 45 and a first microcontroller µC1 in stand-by mode. If a message is received from the control unit that requires cooperation of the connector part 42, a switch 47 is activated by the first microcontroller µC1 so that power supply 46 also energizes a second microcontroller µC2 (in the connector part 42) and communication between the microcontrollers' µC1 and µC2 is initiated. The individual microcontroller refers to logic implementations. They can physically be either implemented as separate controllers, two independent cogs in a real time capable multi-core system or as a time sliced interleaved scheme on a reasonably fast single command queue processor.

The second microcontroller measures the amount of power consumed out from the node, preferably by a power meter PM which is connected to the second microcontroller µC2. The first microcontroller µC1 has a number of input connections "in1" and the second microcontroller µC2 may also have a number of input connections "in2" and output connections "out" to which units (such as sensor units, actuator units, communication units, etc.) may be connected. A passive or low current, sensor unit (e.g. microphone, IR detector, temperature sensor, etc.) is typically connected to the input connections "in1" of the first microcontroller µC1, through which the status of a switch may be determined. An actuator unit is typically connected to the DC connection, via a regulator 49 which determine the amount of power distributed to e.g. a lamp. The type of unit connected to the node will be determined by the second microcontroller as a result of the connections used.

For instance, if the network part 41 receives a message to check the status of a sensor unit (e.g. light switch, dimmer etc.), the first microcontroller µC1 receives a request to check the status of the connected sensor unit, e.g. 47% power for a dimmer, or OFF (0% power) in a light switch is obtained by the input connections "in1". This information is transferred back to the control unit via the transceiver 45 and the housekeeping network.

In another example, the network part receives a message to change the status of an actuator unit (e.g. lamp), and the first microcontroller µC1 activates the switch 47 to energize the second microcontroller µC2 in the connector part 42. Information is transferred from the first microcontroller to the second microcontroller, e.g. using shift registers, and the power to the actuator unit is set in accordance with the content of the message by controlling the regulator 49, e.g. the lamp is turned off if it was energized. If the lamp is turned off, the switch 47 is thereafter inactivated to minimize the power consumption in the node.

The amount of power consumed in the node is also reported back to the control unit to identify any malfunction as described above. If only a sensor unit is connected to the input connections "in1" of the first microcontroller µC1, the power consumption may be assumed to be minimal (close to zero), since very little energy is needed if the second microcontroller µC2 is not activated.

If data communication is provided as a superimposed data communication channel on the two-wire network, a data access unit 48 is provided in the connector part 42, which is controlled by the second microcontroller µC2. The data communication network is provided on the connector part 42 provided the second microcontroller is instructed to allow data access by the control unit.

Computer Network Example

In a network of computers, including a gateway, and printers may be implemented in a two-wire network such as described above. The computers, gateway and printers are connected via a communication node to the two-wire network. Each communication node is provided with a data access unit (as described above) and thus the data communication switch in the gateway described above may be implemented as the data access unit 48 in the communication node to which the gateway is connected. Each data access unit 48 is controlled by the control unit (via the second microcontroller µC2) and thus access to Internet, or access to other computers within the network, may be individually controlled for each computer and printer, or Internet access for all connected devices may be controlled by the gateway node.

Lighting Example

Figure 5:
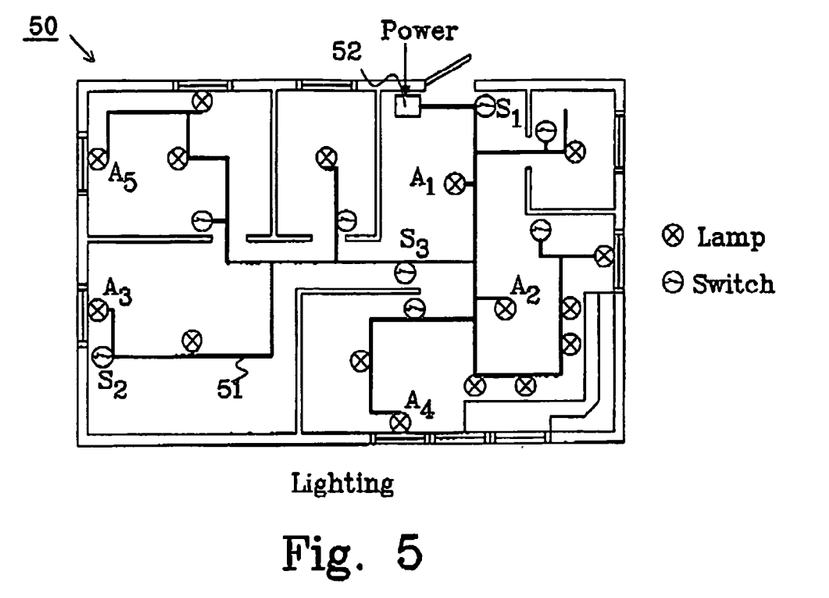
FIG. 5 shows a lighting example in a system according to the invention.

FIG. 5 illustrates how lighting may be implemented in a building 50 using a two-wire network 51 provided with multiple nodes and a control unit. A power converter unit 52 receives incoming power to energize the two-wire network.

Multiple nodes are connected to sensor units, i.e. light switches, $S_1$-$S_3$, and multiple nodes are connected to actuator units, i.e. lamps, $A_1$-$A_5$.

The identity of each node is known to the control unit and the following associations between sensor nodes and actuator nodes may be stored in the control unit and/or the nodes involved in the required functions. Please observe that the power consumption of each node is stored in the control unit, and if only a passive sensor, such as a switch, is connected, the power is minimal, i.e. $P_1 < 1$ mW, and may therefore be set to zero.

TABLE 4

Node identity information including power consumption

| Node | Identity | Type | Status | Power |
|---|---|---|---|---|
| 1 | $S_1$ | Switch | Pos 1 | $P_1$ |
| 2 | $A_1$ | Lamp | 100% | $P_2$ |
| 3 | $A_2$ | Lamp | 100% | $P_3$ |
| 4 | $S_2$ | Switch | Pos 2 | $P_4$ |
| 5 | $S_3$ | Switch | Pos 1 | $P_5$ |
| 6 | $A_3$ | Lamp | 100% | $P_6$ |
| 7 | $A_4$ | Lamp | 100% | $P_7$ |
| 8 | $A_5$ | Lamp | 100% | $P_8$ |

TABLE 5

Associations between sensor units and actuator units

| Association | Sensor unit | Actuator unit(s) |
|---|---|---|
| 1 | S1 | A1; A2 |
| 2 | S2 | A1; A2 |
| 3 | S3 | A3; A4; A5 |

Heating Example

Figure 6:
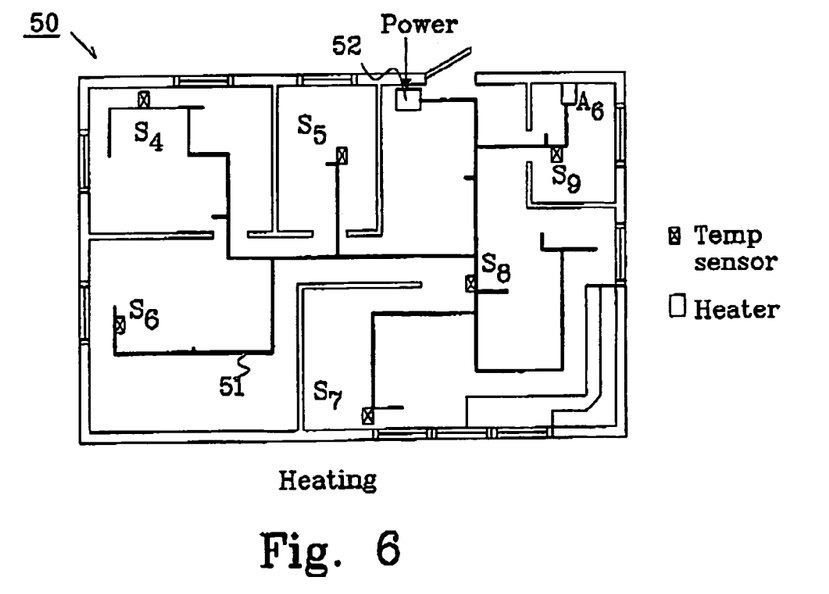
FIG. 6 shows a heating example in a system according to the invention.

FIG. 6 illustrates how heating control may be implemented in the building 50 using the same two-wire network 51 as in FIG. 5. The power converter unit 52 receives incoming power to energize the two-wire network, and multiple nodes are connected to sensor units, i.e. temperature sensors, $S_4$-$S_9$, and only one node is connected to an actuator unit, i.e. heater, $A_6$.

As mentioned before, the identity of each node is known to the control unit and the following associations between sensor nodes and actuator nodes may be stored in the control unit.

TABLE 6

Node identity information including power consumption

| Node | Identity | Type | Status | Power |
|---|---|---|---|---|
| 9 | $S_4$ | Temp sensor | Temp 1 | $P_9$ |
| 10 | $S_5$ | Temp sensor | Temp 2 | $P_{10}$ |
| 11 | $S_6$ | Temp sensor | Temp 3 | $P_{11}$ |
| 12 | $S_7$ | Temp sensor | Temp 4 | $P_{12}$ |
| 13 | $S_8$ | Temp sensor | Temp 5 | $P_{13}$ |
| 14 | $S_9$ | Temp sensor | Temp 6 | $P_{14}$ |
| 15 | $A_6$ | Heater | 45% | $P_{15}$ |

In this case the heat distributed by the heater A6 is a function of the temperature levels received from sensor units $S_4$-$S_9$. Alternatively each room in the building 50 may be individually controlled by a heating loop and then the heater should be divided into six different actuator units all connected to the same node.

The associations between different sensor units and actuator units may be entered into the control unit using a keypad and a display, but it is also conceivable to set a sensor node in a programmable state (e.g. by pressing a button on the node) and thereafter within a predetermined time period indicate the desired actuator nodes (by a similar button) that should be linked to the sensor node. As may be seen from FIG. 5, it is possible to link any switch to any lamp as desired.

The control unit will be able to determine the total amount of power consumed by the units in the system by adding each node's power consumption and if necessary terminate the feeding of the power to the two-wire network. Furthermore, it may be possible to terminate feeding to a specific unit or to terminate the network voltage in order to prevent cable fire.

Due to special circumstances related to the preferred voltage range (i.e. below 50 V DC) used in this invention, so called Safety Extra Low Voltage (SELV) range, the amount of power in the network is limited to 200 VA and a maximum current of 10 A. This means that if more power is needed in an application, such as a stove, heater, etc. it may be necessary to store energy locally or provided parallel feeding cables or cables with increased diameter to that application, i.e. more than one two-wire connection may exist between nodes in the system requiring the implementation of an intelligent power managing scheme ensuring proper operation of all applications and proper dimensions of all cables forming the power distribution network.

A main task of the control unit is to provide arbitration in data communication conflicts, find, identify and link newly added or again available nodes, and to monitor system integrity. System integrity comprises an assessment where on the net and in which application power is consumed, and if all nodes work and wires are connected properly. In a certain less failsafe application, a list of all links can be found only in the control unit, whereas a failsafe implementation would store this information decentralized and retrievable to any node taking over as control unit in case of a malfunction.

In a simple implementation the control unit may be a designated node constant all time, as described in connection with FIG. 2. In order to allow failsafe and robust operation for the network, the control unit may be self-reassigning to any other node presently activated in the network that is triggered by blackout of the previous control unit (i.e. malfunction). Then maintaining and controlling network operation is available on all active nodes in the network at any time.

Figure 7:
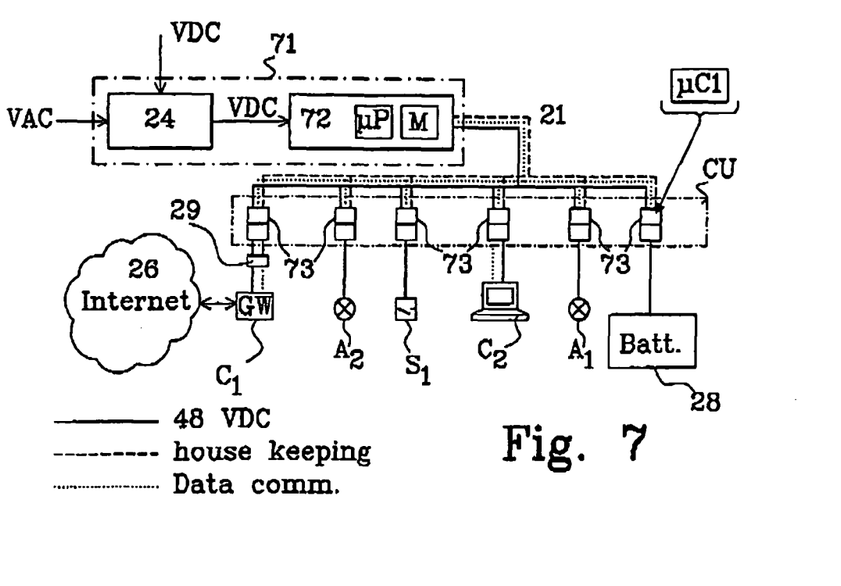
FIG. 7 shows a third embodiment of a power distribution system according to the invention.

FIG. 7 shows a third embodiment of a power distribution system 70 according to the invention. The system 70 is provided with a power converter unit 71 and nodes 73 connected to a network 21 having the same functionality as the system 20 described in connection with FIG. 2. In this embodiment of the system for power distribution and communication, the dedicated control unit in FIG. 2 is omitted and is replaced by a distributed control unit CU implemented in the nodes 73 as indicated by the dash-dot line. In order to achieve this, a part of the functionality included in the dedicated control unit described above must be implemented in the modified power converter unit 71.

It should be noted that the power converter unit 71 has the same functionality as previously described in connection with FIG. 2 and has been modified to also include the functionality of monitoring an amount of power consumed in the network 21. Each node 73 has the same functionality as previously described in connection with FIG. 2 and has been modified to also include the functionality of controlling communication between the nodes 73 connected to the network.

The functionality to monitor the amount of power consumed in the network is preferably implemented in a modified power fuse unit 72. In order to monitor the amount of power consumed in the network, the power fuse unit 72 is provided with a processor μP and a memory M, in which a complete list of nodes in the network is provided. The power fuse unit 72 is configured to communicate with all connected nodes 73 (each having a power meter PM as previously described in connection with FIG. 4) and receive information regarding consumed power. A first microcontroller µC1, as indicated in FIG. 7 and described in connection with FIG. 4, is in this embodiment constructed with a microprocessor having parallel processes for housekeeping and for the distributed control unit. A dedicated memory is also implemented in the first microcontroller µC1 in which information needed to perform the function as the distributed control unit is stored.

This information comprises at least:
a unique serial number of the node
a nickname associated with the unique serial number
the number of nodes "N" within the network
a list of associations relevant for the node The unique serial number is a rather long number, e.g. sixteen digits, provided by the manufacturer of the node. It is not practical to use this long number when communicating within the network, which is the reason for implementing "nicknames" associated with the long number, such as a number "n". By assigning the nicknames sequential, it is easy to determine the number of nodes "N" within the system as described in connection with FIGS. 8 and 9 below. When each node has been assigned a sequential nickname, associations between different sensors and actuators connected to the nodes may be established. A list of associations relevant for each node is stored in the dedicated memory.

Figure 8:
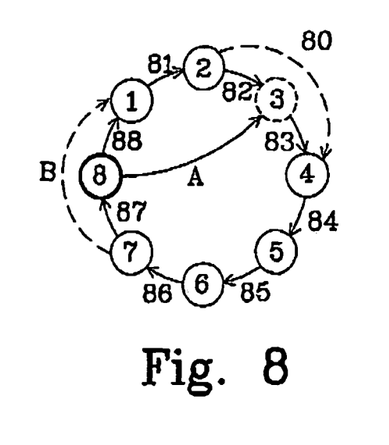
FIG. 8 shows a flow chart exemplifying replacing a node in a system.

FIG. 8 shows a flow chart exemplifying replacing a node in a system. The flow is a continuous process to verify that all nodes in the network are available and operational. The flow may start from any node, but assume for illustration purposes that the flow starts from node "1". Node "1" requests and obtains a confirmation from node "2", as indicated by arrow 81. Node "2" requests a confirmation from node "3" (as indicated by arrow 82) but receives no confirmation, and node "2" therefore assumes that node "3" is no longer available within the network (as indicated with a dashed circle).

At this point, node "2" forwards a notification to node "N" and may continue to request a confirmation of the next sequential number "4", as indicated by the dashed arrow 80. The notification to node "N" (i.e. node "8" in this example) contains a request that it should change the nickname to "3" and also announce changes to relevant associations when an update request has been received from node "7".

The update request process continues from nodes "4" to node "8", as indicated by the arrows 84-87. Node "8" continues the process by sending an update request to node "1" (as indicated by arrow 88) and after confirmation from node "1" responds to the notification received from node "2" and change the nickname to "3" as indicated by arrow "A". A general announcement to all nodes in the network is transmitted indicating that the number of nodes within the network is reduced to "N-1", i.e. "7" in this example, as node "8" replaces the missing node "3".

Alternatively, node "8" directly responds to the notification received from node "2" and immediately replaces the missing node "3" as indicated by arrow "A". The general announcement to all nodes and the announcement regarding changes to relevant associations are thereafter transmitted. The update request process continues from the new node "3" to node "7" as indicated by arrows 83-86 and node "7" sends an update request to node "1" as indicated by arrow "B".

Figure 9:
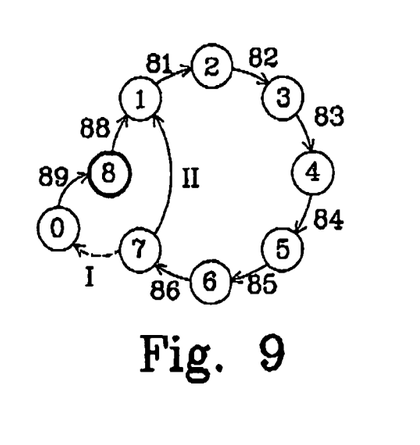
FIG. 9 shows a flow chart exemplifying adding a node in a system.

FIG. 9 shows a flow chart exemplifying adding a node in a system. A node not connected to any network has preferably a default nickname, e.g. n="0", which is changed when introduced. In this example the number of nodes in the network is seven, i.e. N="7". The update request proceeds as described in FIG. 8 to node "7". The last node in the network performs a special task to detect any newly introduced nodes.

Before sending an update request to node "1", as indicated by arrow "II", node "7" transmits a inquiry to nodes having the default nickname, in this example "0", as indicated by the dashed arrow "I". If a new node is detected, it is introduced into the network as indicated by arrow 89 and given a nickname "N+1", which in this example is "8". Node "8" is now the last node in the network and an announcement to all nodes with this information is transmitted by the node before an update request is made to node "1". If no new nodes are detected, node "7" is sending an update request to node "1".

In the event that more than one new node is attached to the network, then several nodes have the same default nickname. This is taken care of by introducing a delay time for responding to the inquiry transmitted by the last node "N" in the network. The delay time is preferably based upon the unique ID number provided by the manufacturer and/or a random number. The first new node that responds to the inquiry will be arranged as node "N+1" and the update procedure thereafter proceeds to node "1". The same procedure will be repeated when node "N+1" sends an inquiry to nodes having the default nickname and arrange the first node that responds to the inquiry as node "N+2" and the update procedure thereafter proceeds to node "1". This process will be repeated until no nodes with the default nickname may be found.

Definitions

A dedicated control unit, such as described in connection with FIGS. 2 and 3, is defined as a control unit that controls communication within the network to avoid any collisions. Furthermore, the dedicated control unit has the complete list of associations between actuator and sensor nodes within the network and is configured to control actions in the applications connected to actuator nodes (e.g. lamps) when initiated by applications connected to a specific sensor node (e.g. a switch). The dedicated control unit preferably also control power consumption within the network and is configured to control the power fuse unit in response to the measured power values. However, this function may naturally be implemented in the power fuse unit as illustrated in FIG. 7 provided collisions within the network are avoided.

A distributed control unit does not control the power fuse unit, as previously described in connection with FIG. 7, since it is more effective to arrange this function in an appointed unit. The term distributed indicates that the function performed by the dedicated control unit is divided between all nodes to perform the desired function. Each node can initialize communication and in order to avoid that a transmitted message from one node to another node is corrupted, a check sum is attached to the message which is checked by the receiving node being the intelligent node in the system. If the check sum is incorrect, the message will be retransmitted. Furthermore, each node has only a local list of associations relevant for the node. A sensor node has a list defining which actuator nodes that should be notified when a change in status is detected in the sensor node (e.g. a switch is turned on). This information is transmitted according to the local list of associations to the actuator nodes. In each receiving actuator node, an action is performed based upon the information (e.g. turning on a lamp).

The invention claimed is:

1. A system for power distribution and communication over a two-wire network, said system comprising:
a control unit configured to receive power from said two-wire network and provided with a transceiver circuitry connected to said two-wire network, a power converter unit comprising a power converter configured to convert at least one incoming voltage to a predetermined DC-voltage of less than 50 V and to feed said DC-voltage to said two-wire network, and
a plurality of nodes connected to and receiving power from said two-wire network;
wherein said power converter unit further comprises: a power fuse unit with a unique identity connected between said power converter and said network, wherein said power fuse unit is configured to forward said DC-voltage to the network, a transceiver circuitry connected to said network, and a power switch configured to terminate forwarding of said DC-voltage to the network when activated,
wherein said control unit is a dedicated control unit comprising a microprocessor and a memory in which the unique identity of the power fuse unit is stored, and is configured to communicate with any unit connected to said two-wire network and having a unique known identity stored in said memory;
wherein each of said plurality of nodes comprises a transceiver circuitry connected to said two-wire network and is configured with a unique known identity enabling control of a function of the node, said unique identity is stored in said memory, at least one of said plurality of nodes is configured as a sensor node and at least one of said plurality of nodes is configured as an actuator node, wherein each sensor node is defined as an entity having at least two states and each sensor node is associated with and controls at least one actuator node in response to a current state of the associated sensor node, and the association between each sensor node and the at least one actuator node is stored in the memory; and
wherein said dedicated control unit is configured to monitor an amount of power consumed in the network and is further configured to communicate with the power fuse unit over said two-wire network to activate the power switch when the amount of power consumed in the network exceeds predetermined limits.

2. The system according to claim 1, wherein said power converter unit further comprises:
an AC/DC converter, and/or
a multi phase AC/DC converter configured to distribute power load over all phases when generating the predetermined DC voltage, and/ or
a DC/DC converter configured to convert any DC voltage to the predetermined DC voltage.

3. The system according to claim 1, wherein said control unit is configured to communicate with the power fuse unit over a housekeeping network implemented as a first superimposed communication channel on said two-wire network.

4. The system according to claim 3, wherein said control unit is further configured to communicate with each sensor node and each actuator node over the housekeeping network to identify changes in the current state of each sensor node and to control each associated actuator node in response to the identified changes in the current state of each sensor unit.

5. The system according to claim 3, wherein said system is further provided with a data communication network implemented as a second superimposed communication channel on said two-wire network, and said control unit is further configured to communicate with each node over said data communication network.

6. The system according to claim 5, wherein said housekeeping network is separated from said data communication network.

7. The system according to claim 5, wherein one node is configured to provide Internet access to the data communication network.

8. The system according to claim 7, wherein said system further is provided with a data communication switch with a unique identity, and said control unit is further configured to:
monitor the housekeeping network, and,
in event of an unauthorized manipulation of the housekeeping network, activate the data communication switch to terminate the Internet access.

9. The system according to claim 5, wherein the one node is configured to provide Internet access to the data communication network via a gateway connected to said node.

10. The system according to claim 3, wherein each node is configured to monitor the amount of power consumed in the node, and further configured to communicate information regarding the amount of power consumed to the power fuse unit over the housekeeping network.

11. The system according to claim 1, wherein a sensor unit is connected to each sensor node, and said sensor unit is a light switch; dimmer; alarm sensor; motion sensor; photo sensor; sound sensor; vibration sensor; moisture sensor; gas sensor; integrity sensor; or temperature sensor.

12. The system according to claim 1, wherein an actuator unit is connected to each actuator node, and said actuator unit is a lamp; lighting system; alarm system; motor; pneumatic system; or heater.

13. The system according claim 1, wherein said system comprises multiple sensor nodes, each having input variables, and multiple actuator nodes, each having output variables, and the associations between sensor nodes and actuator nodes are logical relations between the input and output variables.

14. The system according to claim 1, wherein a function is coupled to each association.

15. A system for power distribution and communication over a two-wire network, said system comprising:
a control unit configured to receive power from said two-wire network and provided with a transceiver circuitry connected to said two-wire network,
a power converter unit comprising a power converter configured to convert at least one incoming voltage to a predetermined DC-voltage of less than 50 V and to feed said DC-voltage to said two-wire network, and
a plurality of nodes connected to and receiving power from said two-wire network;
wherein said power converter unit further comprises: a power fuse unit with a unique identity connected between said power converter and said network, wherein said power fuse unit is configured to forward said DC-voltage to the network, a transceiver circuitry connected to said network, and a power switch configured to terminate forwarding of said DC-voltage to the network when activated,
wherein said control unit is a distributed control unit;
wherein each of said plurality of nodes comprises a transceiver circuitry connected to said two-wire network and is configured with a unique known identity enabling control of a function of the node, and each said node comprises a processor and a dedicated memory in which said unique identity is stored, and said plurality of nodes are configured to form said distributed control unit, at least one of said plurality of nodes is configured as a sensor node and at least one of said plurality of nodes is configured as an actuator node, wherein each sensor node is defined as an entity having at least two states and each sensor node is associated with and controls at least one actuator node in response to a current state of the associated sensor node, and the association between each sensor node and the at least one actuator node is stored in the dedicated memory; and wherein said power fuse unit comprises a processor and a memory in which a complete list of nodes in the network is provided, and the power fuse unit is configured to communicate with all of said nodes and receive information regarding consumed power to monitor an amount of power consumed in the network and activate the power switch in the power fuse unit when the amount of power consumed in the network exceeds predetermined limits.

16. The system according to claim 15, wherein said power converter unit further comprises:

an AC/DC converter, and/or a multi phase AC/DC converter configured to distribute power load over all phases when generating the predetermined DC voltage, and/ or a DC/DC converter configured to convert any DC voltage to the predetermined DC voltage.

17. The system according to claim 15, wherein said control unit is configured to communicate with the power fuse unit over a housekeeping network implemented as a first superimposed communication channel on said two-wire network.

18. The system according to claim 17, wherein said control unit is further configured to communicate with each sensor node and each actuator node over the housekeeping network to identify changes in the current state of each sensor node and to control each associated actuator node in response to the identified changes in the current state of each sensor unit.

19. The system according to claim 17, wherein said system is further provided with a data communication network implemented as a second superimposed communication channel on said two-wire network, and said control unit is further configured to communicate with each node over said data communication network.

20. The system according to claim 19, wherein said housekeeping network is separated from said data communication network.

21. The system according to claim 20, wherein said system further is provided with a data communication switch with a unique identity, and said control unit is further configured to:

monitor the housekeeping network, and, in event of an unauthorized manipulation of the housekeeping network, activate the data communication switch to terminate the Internet access.

22. The system according to claim 19, wherein one node is configured to provide Internet access to the data communication network.

23. The system according to claim 19, wherein the one node is configured to provide Internet access to the data communication network via a gateway connected to said node.

24. The system according to claim 17, wherein each node is configured to monitor the amount of power consumed in the node, and further configured to communicate information regarding the amount of power consumed to the power fuse unit over the housekeeping network.

25. The system according to claim 15, wherein a sensor unit is connected to each sensor node, and said sensor unit is a light switch; dimmer; alarm sensor; motion sensor; photo sensor; sound sensor; vibration sensor; moisture sensor; gas sensor; integrity sensor; or temperature sensor.

26. The system according to claim 15, wherein an actuator unit is connected to each actuator node, and said actuator unit is a lamp; lighting system; alarm system; motor; pneumatic system; or heater.

27. The system according claim 15, wherein said system comprises multiple sensor nodes, each having input variables, and multiple actuator nodes, each having output variables, and the associations between sensor nodes and actuator nodes are logical relations between the input and output variables.

28. The system according to claim 15, wherein a function is coupled to each association.

* * * * *